United States Patent
Housel (10) Patent No.: US 6,934,047 B2
(45) Date of Patent: Aug. 23, 2005

(54) INTEGRATION OF COLOR PAGES ON A BLACK AND WHITE PRINTER MANAGED BY A RASTER IMAGING PROCESSOR

(75) Inventor: Edward M. Housel, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 724 days.

(21) Appl. No.: 09/777,476

(22) Filed: Feb. 6, 2001

(65) Prior Publication Data

US 2002/0105672 A1 Aug. 8, 2002

(51) Int. Cl.⁷ .............................. G06F 3/12; G06F 13/00
(52) U.S. Cl. ..................... 358/1.15; 358/1.13; 358/1.14
(58) Field of Search .................................. 358/1.15, 1.9, 358/1.6, 1.4, 1.12, 1.14, 1.18, 2.1, 3.21, 501, 524, 530, 403, 449

(56) References Cited

U.S. PATENT DOCUMENTS

| | | | |
|---|---|---|---|
| 4,743,962 A | 5/1988 | McCormick | 358/75 |
| 5,604,598 A | 2/1997 | Shigemura | 358/296 |
| 6,041,200 A | 3/2000 | Glass et al. | 399/82 |
| 6,650,431 B1 * | 11/2003 | Roberts et al. | 358/1.15 |

FOREIGN PATENT DOCUMENTS

| | | | |
|---|---|---|---|
| EP | 1 052 844 A2 | 11/2000 | H04N/1/32 |
| EP | 1 052 844 A3 | 6/2002 | H04N/1/32 |

* cited by examiner

*Primary Examiner*—Douglas Tran
(74) *Attorney, Agent, or Firm*—Richard A. Romanchik (57) ABSTRACT

Systems and processes to simplify and streamline the printing of documents containing both black and white and color pages. The invention uses a raster imaging processor to manage the organization and execution of the print job. In addition, the invention generates an operator instruction sheet to ensure proper completion of the print job.

12 Claims, 6 Drawing Sheets

INTEGRATION OF COLOR PAGES ON A BLACK AND WHITE PRINTER MANAGED BY A RASTER IMAGING PROCESSOR

FIELD OF INVENTION

The present invention relates generally to the field of digital imaging. More particularly, it relates digital imaging for the purpose of printing documents and images and apparatus and methods for improving the efficiency of such printing.

BACKGROUND OF THE INVENTION

Digital printers are in common use today for many production processes ranging from printing of a single document to large scale production of multiple copies of documents. These printers receive print jobs in two basic manners. In a typical networked system, the print jobs are submitted through the network. Alternatively, the print job could be entered through the printer user interface. In any event, when the print job is submitted through the network or printer user interface, the print operator enters certain data. This data is often referred to as job ticket data and contains the print job parameters or the print job features. The data includes information about certain characteristics of the job, such as paper size, and paper handling and finishing instructions, including setup instructions for the necessary finishing devices to be used in completing the print job. Such setup information is generally entered in an operator message that will be displayed on the printer user interface when the job arrives at the printer.

When a print job is entered through the network interface, the job is placed in a print server queue on the network, until a slot opens in the raster image processor (RIP) queue in the printer system. When the print job is transferred to the RIP queue, it is assigned a print job number and the RIP generates an operator message, if one is associated with the print job. The setup instructions for a given print job are displayed on the printer user interface as an operator message. The operator message informs the operator that a certain print job requires custom setup, and specifies the particular setup parameters. However, while the setup instructions for a particular job are displayed on the printer user interface, it is typically not possible to display the entirety of the set up information. Typical printer displays only allow the display of only a limited amount of information in an operator message, for example sixty-three characters, thereby imposing restrictions on the amount of instructions that may displayed at a given time on the printer user interface. This results in a limited amount of information being provided to the operator, possibly in a cryptic, abbreviated fashion, making it difficult for inexperienced operators to properly setup the machine and making it more likely that even experienced operators will misunderstand the instructions.

In addition, more and more documents are being created that include pages that have color and pages that have simply black and white text. Historically, to run such a print job one of two methods were followed. One way would be to run the entire job on a color printer. While this method saves time it is a poor use of the color printer as a resource. Generally, the demand for color printing is high and its use is more expensive. It is a waste of the value of the printer to produce pages that have no color on a color printer.

Another method was to separate those pages that include color from those pages that do not and print each set of documents on separate printers. After the printing was completed the document was assembled manually to reinsert the color pages back into the document. While this process has the advantage of the most efficient use of the equipment, it entails a tremendous amount of manual labor and requires the operator to maintain records as to the original organization of the document for proper reassembly.

Therefore, there is a need to improve the process of printing hybrid documents that contain both color and non-color pages.

SUMMARY OF THE INVENTION

The present invention is directed to systems and methods for production of hybrid color and black and white documents. More specifically it is directed to a system for printing such hybrid documents in a manner that reduces the need for operator action and intervention. The present invention uses a data processor associated with a digital printer to identify color pages in a print job, generate a file with just those color pages, print the color pages, instruct the operator on proper printer set-up and automatically merge the color pages into the black and white pages in the final print product. In this manner it eases the production of such hybrid documents.

One aspect of the present invention is a process for printing mixed color and black and white print jobs wherein a print job, including pages with color and pages only in black and white, is entered into a printer in machine readable form. The pages with color are then printed on a color printer. A digital printer is set up so that it can access the printed color pages and the print job is run on the digital printer, including merging the color page into the black and white pages to result in a merged document.

Another aspect of the present invention is a process for printing mixed color and black and white print jobs. The process includes entering into a data processor a print job in machine readable form and processing the print job to identify the pages within the job containing color. The processor then creates and stores a first digital file of the pages containing color and a second digital file of the pages that are only black and white. The processor also creates and stores additional digital files containing the features of the print job including the location of the color pages. The color pages stored in the first digital file are then printed on a color printer. A digital printer is then set up so it can access the printed color pages and the print job is run on the digital printer including merging the color page into the black and white pages to result in a merged document.

Yet another aspect of the present invention is directed to a system for printing and automatically merging a print job that includes both color pages and entirely black and white pages. The system includes at least three elements. First, there is a data processor configured to receive a print job in machine readable form and to analyze the print job to determine what pages in the print job include color, what pages do not include color and where in the print job those pages are located. Second there is a color printer in communication relationship the data processor to receive the data related to the color pages identified by the data processor and print the color pages. Finally, there is a black and white digital printer capable of receiving the printed color pages and further capable of receiving data for the data processor, wherein the digital printer prints the non-color pages and inserts the color pages received from the color printer in their proper location in the print job.

These and other aspects of the invention will become more evident in the detail description of the invention below.

DETAILED DESCRIPTION OF PREFERRED EMBODIMENTS

Figure 1:
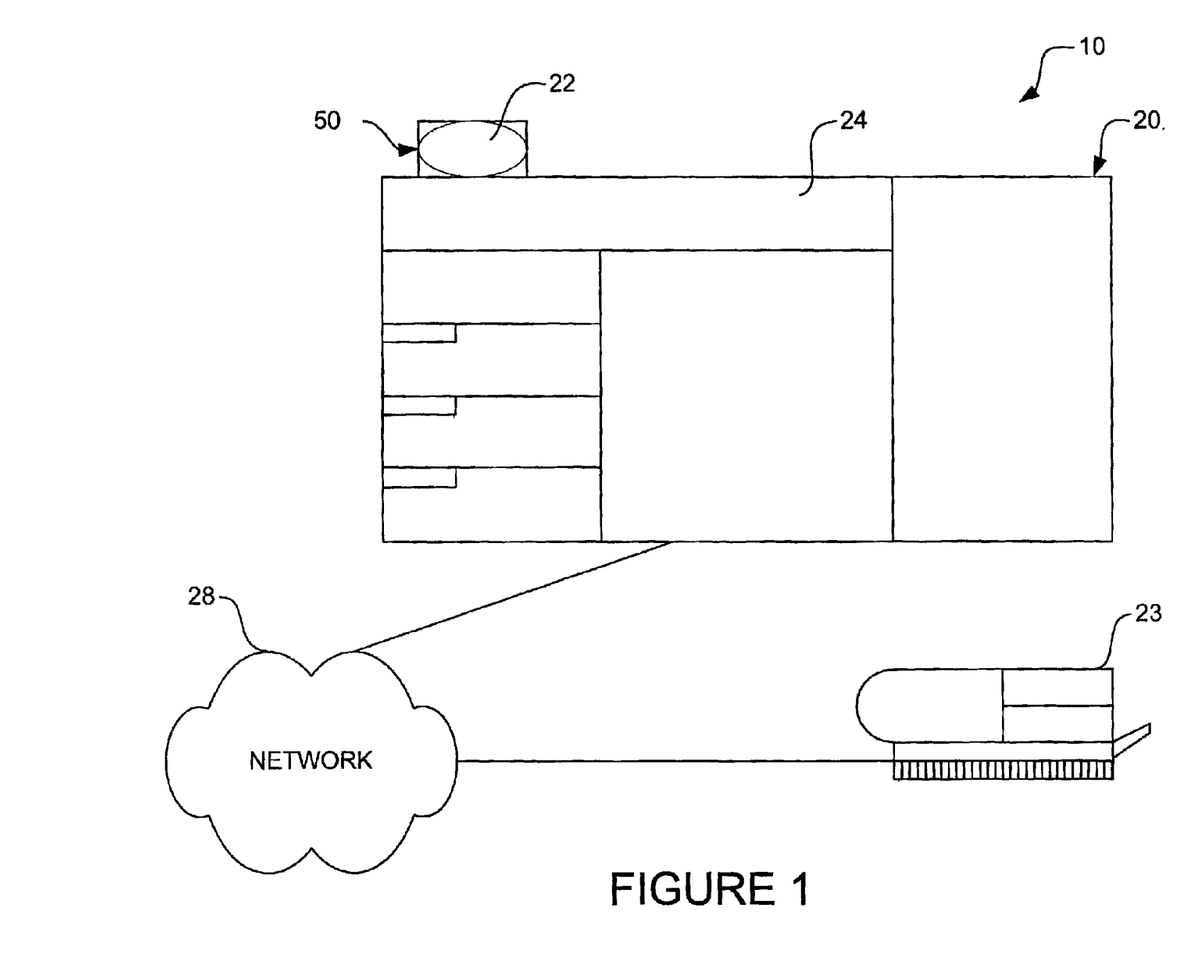
FIG. 1 depicts a typical lay pout of a digital printing system
Figure 2:
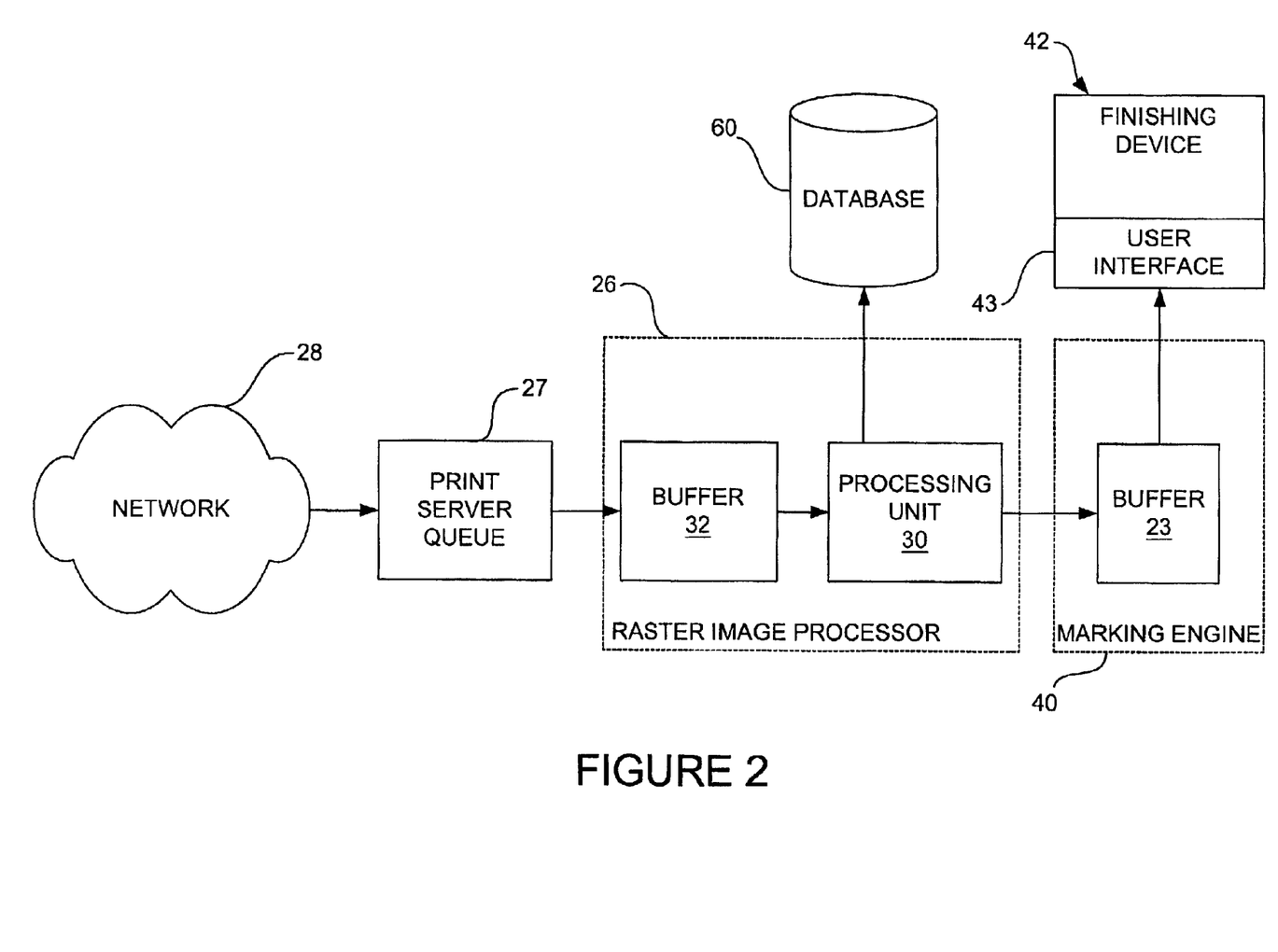
FIG. 2 is a detailed layout of the digital printer in the printing system.

Referring to FIGS. 1 & 2, a typical print system of the type employing the present invention includes a digital printer 20, preferably a high speed digital printer, having a printer user interface 22 and a top exit copy tray 24. The system also includes at least one color printer 23 networked to the digital printer 20. While the exemplary print system 10 shown is a network printing system configured to receive remote input through a network connection, other configurations are contemplated and possible within the scope of the present invention. For example, a system where input is local and/or where multiple printers are connected to the same network would be within the scope of the present invention. While a particular printer configuration is discussed herein, it is to be understood that the present invention may be incorporated in other printing system configurations.

The printer 20 includes a raster image processor (RIP) 26 that receives incoming data from a network 28 to which the printer 20 is connected. Prior to being transferred to the raster image processor 26, the print job may be held in a print server queue 27 on the network 28. The raster image processor 26 includes processing unit 30, that receives control commands and data from the network 28. Control commands are translated into machine control language by the processing unit 30, while incoming print jobs and program codes are stored in a print job buffer 32, also referred to as the RIP queue.

The printer 20 also includes a marking engine 40, that incorporates standard paper handling and processing equipment necessary, for example, for producing images on output paper. The marking engine 40 receives and stores in a multiple page image buffer 23, a data stream, including image data and control data generated by the processing unit 30. The image data is processed and transmitted to a write head (not shown) for transfer to the output pages.

The marking engine 40 also includes output devices that transfer the printed output pages to one or more finishing devices 42 connected to the printer 20 by a simple electrical connection 12. The finishing device 42 includes a finishing device user interface 43. The finishing device 42 may be any commonly used finishing device, such as a hole punch or binder.

The printer 20 includes a logic control center 50, including a printer user interface 22, through which the operator inputs functions and receives messages from the printer 20. The printer 20 also includes a database 60 of shared instructions, stored on a local disk, accessed by the RIP 26. The instructions stored in the database 60 include, for example, setup instructions for a particular finishing device that are to be followed by the operator in all cases, regardless of the particular configuration chosen. Generally, these instructions will include directions as to how to physically set up a given finishing device. For example, a hole punch may have detents that must be physically moved to a desired position, but are secured by spring-loaded pins that must be removed prior to moving the detents. Likewise, the shared instructions may remind the operator to power down a particular finishing device prior to performing setup operations thereon, should that step be necessary.

When color pages are introduced to the system, there are many possible workflows for achieving printing of color pages in predominantly black and white documents. Most of them are not automatic and all require the operator to make many (or all) decisions about the job. The present invention takes advantage of information generally already available to the printer to automate at least portions of this process.

At the highest level, the print job must come to the RIP 26 with some important job request information. The RIP 26 must receive the data encoding some properties of the color printers available for printing the color pages of the document. The printer operator must provide certain set-up information about the jam rate of the printer when using output of a given color printer, plus defaults to apply when the job is not fully specified. Finally the operator must be aware that the RIP/system is going to provide instructions as to how to print the color part of the job, load the trays for the job, and how to recover in the event of a jam.

Input Job

Digital printing requires that an electronic version of the document to be printed (the input job) be prepared. Typically, the electronic version of the document is a computer readable file written in a Page Description Language ("PDL"), of course other formats would work, as well. PDL files typically contain commands in American Standard Code for Information Interchange ("ASCII") format. An advantage of storing a document as a PDL file is that the PDL file is typically much smaller than if the document were stored as a bitmapped image file. The printing device reads the PDL file and performs printing functions according to the instructions in the PDL file. Sending instructions to the printing device in ASCII code is more efficient than creating a bitmapped image of the document and then sending the bitmapped image to the printing device. For example, it is much more efficient to send a few ASCII characters to the printing device that instruct the printing device to print the string "PDF" in 24 point Times New Roman font than it is to create a bitmapped image of the string at 600 dots per inch resolution and then send the whole bitmapped image to the printing device. Examples of PDL file formats are the Portable Document Format ("PDF") format and the Post-Script format, both by Adobe Systems Inc. of Palo Alto, Calif.

PDL files are typically stored on a computer readable medium and are accessible by a computer running a Print Document Management System program. When ready for printing, the printer operator sends some or all of the PDL file to a raster imaging processor (RIP). The RIP processes the PDL instructions that it receives and instruct associated printers to print one or more pages of the document. It is to be understood, however, that the present invention is not limited to the devices or configuration that use a PDL format. Many other formats for storing the document in electronic form are possible, such as in graphical format, and on other storage media, and the present invention is not restricted to the formats and media described herein.

Raster Imaging Processor

Raster imaging processors are widely used in the art. The principal function of the RIP is to process the input job into rasters or a stream of bits representing either black or white, or a shade of color for each element of the image. In doing this processing the RIP has a great deal of information about the input job that can help manage the printing of the job.

For example, rasters can distinguish color images from black and white images. Specifically a RIP can detect the presence of color by analyzing the raster information for the percentage of cyan, magenta and yellow in the stream. In this manner a RIP can determine what pages should be printed using a color printer and what pages should be printed on a black and white printer. The RIP can also be used to group the color pages and route them to a color printer for printing apart from the black and white pages.

In addition, the RIP can identify and retain information as to where the color pages are located within a print job. This information allows the RIP to reintegrate the color pages into the print job when collating the final product.

The printing of the document also requires over sight and some activity on behalf of the printer operator. As how a job is managed will vary from job to job, the RIP can also be used to generate and print out an operator instruction sheet so the operator knows how the job should be handled.

First Pass of Input Job Through RIP

Figure 3:
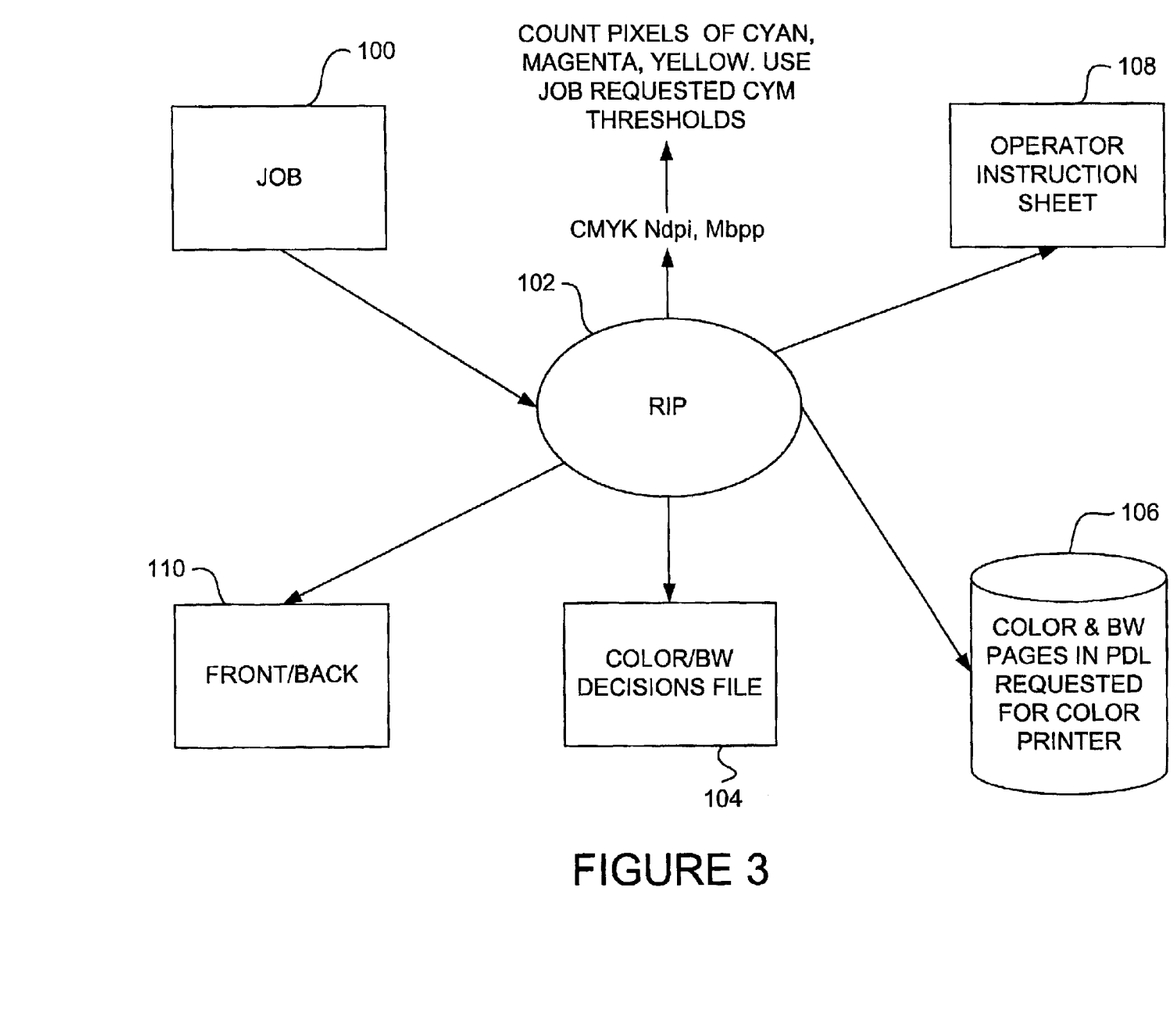
FIGS. 3–6 depict process steps associated with aspects of the present invention.

FIGS. 3–6 illustrate the four stages of a typical job when employing the present invention. FIG. 3 is a representation of the first pass of the input job 100 through the RIP 102. As shown in FIG. 3, the job 100 in digital form is accessed by the RIP 102. The RIP 102 then analyzes the job 100 for color pages. The analysis entails counting the Cyan, Magenta and Yellow pixels in each page of the job 100. The job 100 includes job request thresholds that allow the RIP 102 to decide whether the page includes color and should be printed in color or should be printed in black and white. Based on these thresholds, the RIP 102 creates a color/BW decision file 104. This decision file 104 records the location of each page containing color in the job 100.

The job request decision threshold can be set for each job 100. Typically, the settings are a threshold number of color pixels above which the pages is designated as including color and below which the page is forced to black and white. An example of such a threshold setting as part of the job request information is:

Job::Feature Enable

Job::PrintColorPagesBWwhen((Cyan+Magenta+Yellow) LT 1% coverage

Job::PrintColorPagesBWwhen(Cyan LT 2% coverage)

Job::PrintColorPagesBWwhen(Magenta LT 2% coverage)

Job::PrintColorPagesBWwhen(Yellow LT 2% coverage)

In this example, when using a CMYKraster color PDL, any page with less that 2% Cyan, Magenta or Yellow pixels (or less that 1% of all three combined) would be designated for printing as a black and white document. If, however, this threshold is exceeded then the page would be designated for printing as a color document. It will be understood of course that the threshold levels can be varied and still be within the present invention. If the job request information does not include any threshold setting the RIP 102 preferably has a default setting. The default setting can vary from forcing the entire print job to black and white to some other threshold of color.

As the RIP 102 identifies the pages in the document that include color, it builds a Color File 106 that includes those pages. This Color File 106 is stored in an appropriate storage media such as a hard drive, CDRW, floppy disc, zip drive or RAM. This file will be used to instruct a color printer on printing of pages that include color. The RIP 102 also creates a Front/back file 110. The front/back file 110 keeps track of whether particular page is located on the front or back of a sheet in duplex mode. When preparing for final print and collation this information is important as may affect the set up of the printer.

In addition, the RIP 102 instructs a printer to print an Operator Instruction Sheet 108. The Operator Instruction Sheet 108 includes instructions for the operator on the proper set up of the job and the proper handling of the color pages. Some of the items that may be included on the Operators Instruction Sheet 108 are: Printer required (either by name or attributes), media attributes (i.e., color, weight, type, size), the number of sets that should be printed, what to do if the color printer jams, in which supply(s) on the high speed printer to load the printed color pages into, and what to do if more color originals are needed. This and other information is available at the RIP 102 and can easily be incorporated into the Operator Instruction Sheet 108.

Second Pass of Input Job Through RIP

Figure 4:
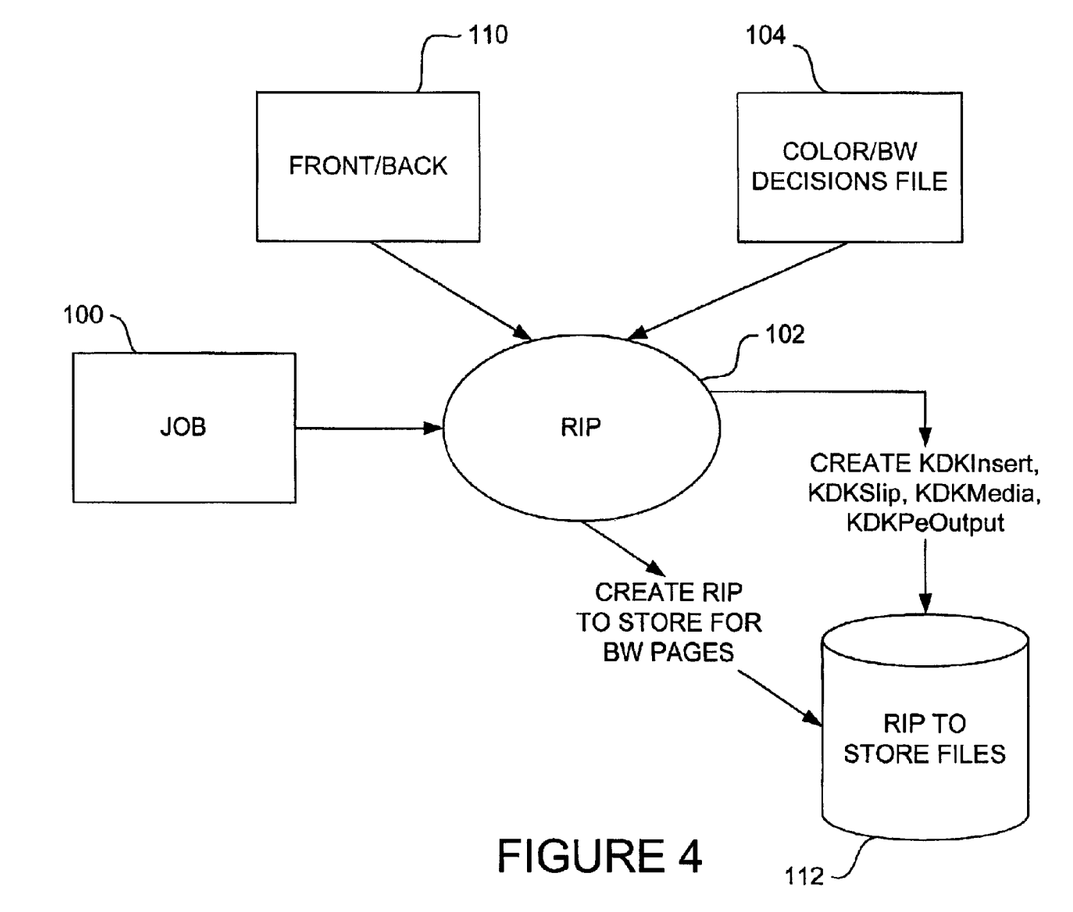

FIG. 4 illustrates the operation of the RIP 102 during a second pass of the job 100 through the RIP 102. In the second pass of the job 100 through the RIP 102, the RIP 102 creates the Store Files files 112. The Store Files files 112 contain information about the files for production printing. Specifically, this information includes the pages that were identified as having no color, and the organization of the job 100. This organization may include where color pages should be inserted into the final print job, the media upon which the job is to be printed and any changes therein during the job 100, the source of the media, i.e., the input tray to be used, the output location for the job 100, i.e., the finishing equipment to be used. The Store Files files 112 are created by utilizing the Color Decision File 104 and the Front/Back File 110.

Printing the Color Pages

Figure 5:
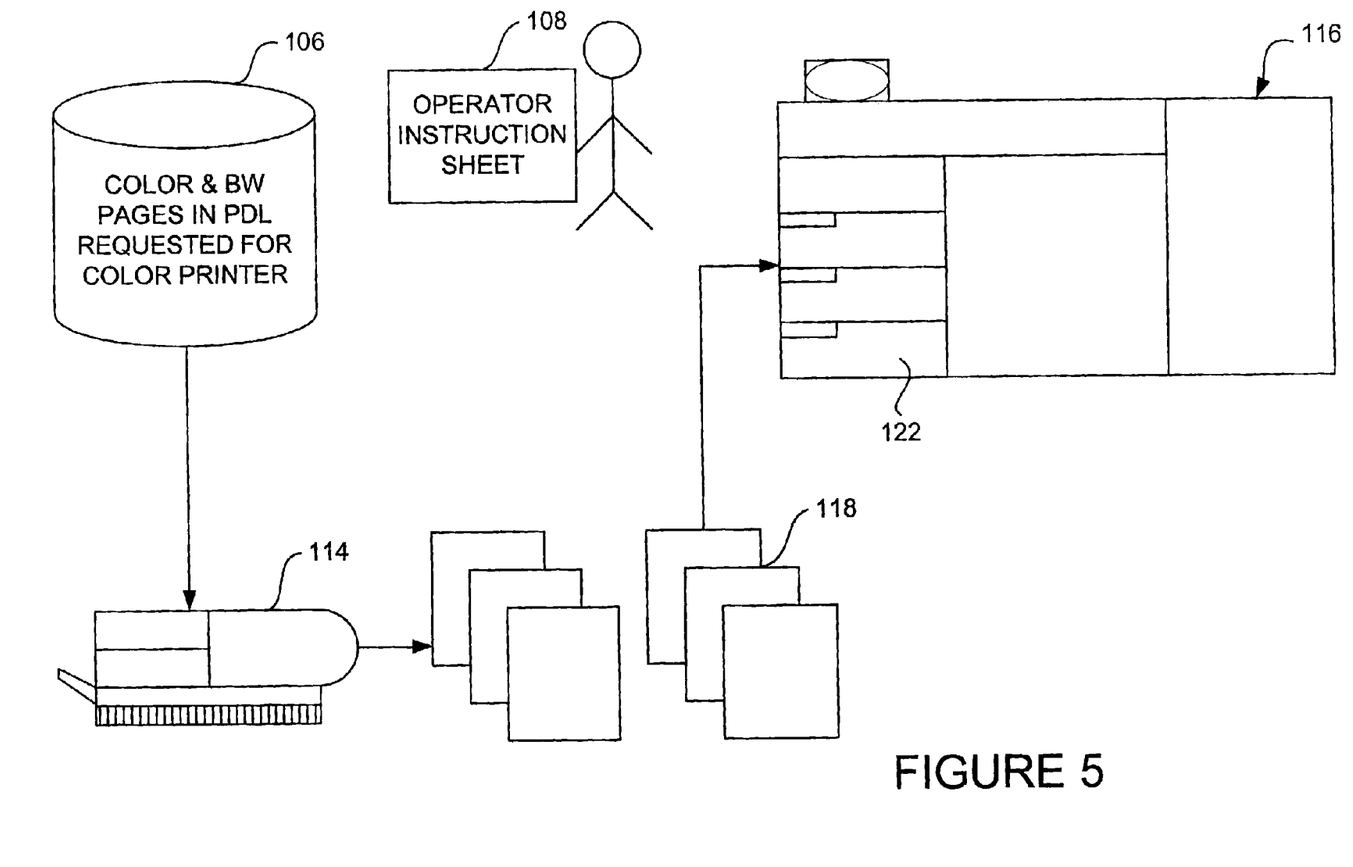

FIG. 5 demonstrates the process by which the invention processes color pages in a print job. In order for the operator to properly set up the machine to run the print job, he must print the pages identified in the Color File 106. Color File 106 is routed to a color printer 114 and the pages 118 are printed. Any appropriate color printer is sufficient such as an ink jet printer presently available from Canon, Hewlitt Packard, Xerox and others or a Heidelberg QM46di printer.

Once the color pages are printed, the operator refers to the instruction sheet 108 for handling of the color pages 118. Generally, the operator will be instructed to load the color pages into an input tray of the digital printer 116. This loading will vary depending on parameters of the job. For example, if the color pages are to be the back side of a duplex copy the operated may be instructed to load the pages into the input tray 122 face down. If on the other hand the color page is completed and no further printing is necessary on that page, the operator may be instructed to insert that page in a input tray 122 that feeds pages to the printer 116 after the fuser but prior to the page collator.

Retrieve Print

Figure 6:
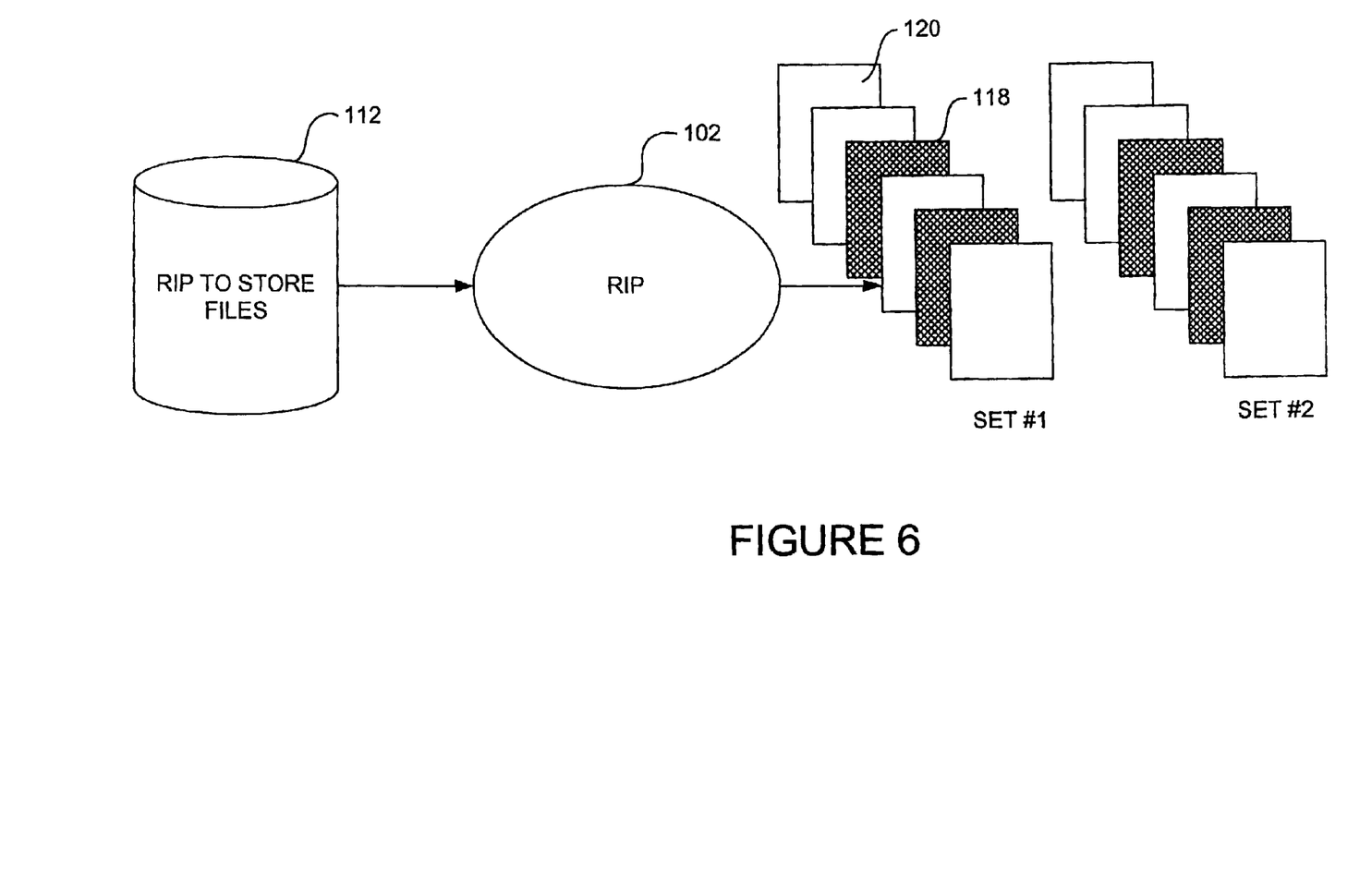

FIG. 6 illustrates the final step in the present invention. Once the color pages 118 have been properly inserted into the input tray of the digital printer 116, the operator instructs the digital printer 116 to retrieve the Store Files files 112. The complete job is then run through the digital printer 116. The digital printer 116 prints the previously unprinted black and white pages 120 and retrieves the color page 118 form the input tray at the appropriate time to insert them in the appropriate location in the job 100. The final work product is thus an automatically merged black and white and color print job. The need for an operator to take two final print jobs (one black and white and the other color) and manually combine them to reach a final product is eliminated. The final product can also be automatically sent to finishing without the need for operator intervention. For example following the print run the job can be automatically be routed to a binder without need for operator action.

The present invention may best be described by following a single job through to completion. An example of a very simple job would be a ten page, double sided, document where pages 3 and 8 contain color. The job specifies that the first and last page should be printed on heavier paper than the other pages and two copies of the document are needed. The job is provided to the RIP in digital form. The RIP processes the job and identifies page 3 and 8 as containing color by analyzing the pixels associated with the rasterized document. A color file is created with these two pages in it. An instruction sheet is printed that advises the operator to: Load heavy stock paper in one input tray, regular stock in another input tray, to print the color pages 3 and 8 on a color printer and insert those in yet another input tray with page 3 face up and page eight face down. Other instructions may be included but for purposes of the present example these are sufficient to describe the invention. The RIP then reprocesses the job to analyze the job as a whole identifying where the color pages are located in the document the appropriate input and output trays to be used and storing rasterized versions of the black and white pages of the document. All of this information is put into Store Files files and the print job is put in a hold queue, pending operator instruction. The operator prints the color pages (two sets) on a color printer and inserts them according to the instruction sheet in the input tray of the digital printer. The operator next releases the job from the hold queue and the digital printer retrieves the store files and the job is run. Pursuant to the job parameters, the first and second pages are printed on opposing sides of heavy stock paper. The third page is retrieved from the input tray holding the color pages and page four is printed on the back side of the sheet. The next few pages are printed as normal duplex printing on regular stock paper. Page seven is printed on the front side of the page on which color page eight is printed and the final pages are printed on opposite sides of heavy stock paper. Because the job request calls for two sets that process is then repeated. The final product is a two sided merged black and white and color document with the color pages inserted in the correct locations automatically.

It should be understood that the illustrated embodiments are exemplary only and should not be taken as limiting the scope of the present invention. For example, the invention can be used with various protocols and is not limited to the protocols detailed herein. The claims should not be read as limited to the order or elements unless stated to that effect. Therefore, all embodiments that come within the scope and spirit of the following claims and equivalents thereto are claimed as the invention.

I claim:

1. A process for printing mixed color and black and white print jobs comprising the steps of:
   receiving a print job in machine readable form, the print job having a plurality of pages;
   processing the job into rasters;
   identifying the pages within the raster processed job containing color;
   creating and storing a first digital file of the pages containing color;
   creating and storing a second digital file of the pages that are only black and white;
   creating and storing additional digital file containing the feature of the print job including the location of the color pages;
   printing the color pages stored in the first digital file on a color printer;
   setting up a digital printer so it can access the printed color pages; and
   running the print job on the digital printer including merging the color pages into the black and white pages to result in a merged document.

2. The process of claim 1, wherein the operator is able to manually force color or black and white printing on a given page of the print job.

3. The process of claim 1 wherein the identification of the pages within the print job that contain color is performed by analyzing pixels of the raster processed job to determine whether the percentage of cyan, magenta and yellow pixels exceed a threshold level, wherein pages that exceed the threshold level are identified as containing color and those that do not are forced to black and white.

4. A process for printing mixed color and black and white print jobs comprising the steps of:
   entering a print job in machine readable form;
   processing the print job to identify the pages within the job containing color;
   creating and storing a first digital file of the names containing color;
   creating and storing a second digital file of the pages that are only black and white;
   creating and storing additional digital file containing the feature of the print job including the location of the color pages;
   printing the color pages stored in the first digital file on a color printer;
   setting up a digital printer so it can access the printed color pages; and
   running the print job on the digital printer including merging the color names into the black and white pages to result in a merged document, wherein the identification of the pages within the print job that contain color is performed by analyzing the pixels to determine whether the percentage of cyan, magenta and yellow pixels exceed a threshold level, wherein pages that exceed the threshold level are identified as containing color and those that do not are forced to black and white, and wherein the threshold level is set at 2% of either cyan, magenta or yellow pixels and 1% of the combination of all three.

5. The process of claim 1 wherein the step of setting up a digital printer so it can access the printed color pages comprises placing the printed color pages in an input tray of the digital printer.

6. The process of claim 1 wherein the processing, creating and storing steps are performed by a raster imaging processor.

7. The process of claim 1 further comprising the step of printing an operator instruction sheet.

8. The process of claim 7 wherein the operator instruction sheet is printed before the color pages are printed.

9. A system for printing and automatically merging a print job that includes both color pages and entirely black and white pages, comprising:
   a data processor configured to receive a print job in machine readable form;
   a raster imaging processor (RIP) to process the job into rasters;
   and analyze the raster processed print job to determine what pages in the print job include color, what pages do not include color and where in the print job those pages are located;

a color printer in communication relationship with the RIP to receive the data related to the color pages identified by the data processor and print the color pages; and a black and white digital printer capable of receiving the printed color pages and further capable of receiving data for the data processor, wherein the digital printer prints the non-color pages and inserts the color pages received from the color printer in their proper location in the print job.

10. The system of claim 9 wherein the digital printer is a high speed digital printer.

11. The system of claim 9 wherein the raster imaging processor counts cyan, magenta and yellow pixels in each page of the raster processed print job to determine whether there is color on the page, said determination is based on whether the number of pixels exceeds a threshold level.

12. A system for printing and automatically merging a print job that includes both color pages and entirely black and white pages, comprising:

a data processor configured to receive a print job in machine readable form and analyze the print job to determine what pages in the print job include color, what pages do not include color and where in the print job those pages are located;

a color printer in communication relationship the data processor to receive the data related to the color pages identified by the data processor and print the color pages; and a black and white digital printer capable of receiving the printed color pages and further capable of receiving data for the data processor, wherein the digital printer prints the non-color pages and inserts the color pages received from the color printer in their proper location in the print job, wherein the raster imaging processor counts cyan, magenta and yellow pixels in each page of the print job to determine whether there is color on the page, said determination is based on whether the number of pixels exceeds a threshold level, and wherein the threshold level is set at 2% of either cyan, magenta or yellow pixels and a total of 1% when all three are combined.

* * * * *